United States Patent [19]

Yoshida et al.

[11] Patent Number: 4,510,656
[45] Date of Patent: Apr. 16, 1985

[54] SLIDE FASTENER ASSEMBLY

[75] Inventors: Hiroshi Yoshida, Kurobe; Yoshio Matsuda, Nyuzen; Akira Komeya, Kurobe, all of Japan

[73] Assignee: Yoshida Kogyo K.K., Tokyo, Japan

[21] Appl. No.: 437,293

[22] Filed: Oct. 28, 1982

[51] Int. Cl.³ .............................................. A44B 19/00
[52] U.S. Cl. ........................................ 24/390; 24/398; 24/408; 24/393; 66/193; 66/195
[58] Field of Search ................................. 66/195, 193; 24/390–398, 408

[56] References Cited

U.S. PATENT DOCUMENTS

| | | | |
|---|---|---|---|
| 4,019,227 | 4/1977 | Ebata | 66/195 |
| 4,056,868 | 11/1977 | Ebata | 66/193 |
| 4,065,835 | 1/1978 | Yoneya | 66/195 |
| 4,215,453 | 8/1980 | Matsuda | 66/195 |

FOREIGN PATENT DOCUMENTS 52-43682  4/1977  Japan .
52-73287  6/1977  Japan .
53-107582  8/1978  Japan .

Primary Examiner—Ronald Feldbaum
Attorney, Agent, or Firm—Hill, Van Santen, Steadman & Simpson

[57] ABSTRACT

A slide fastener assembly has a net joining structure which includes a pair of warp-knitted adapters having a number of rectangular meshes defined by a plurality of warp cords and a plurality of weft threads. Each adapter has a net transition region including a plurality of longitudinal portions having meshes of varying sizes arranged for easy connection to one of the confronting edges of a net structure and for taking up and distributing lateral tension uniformly over the length of the slide fastener stringer supported by and between a pair of web regions of the adapter. The stringer is sewn to the web regions by at least one row of sewing stitches extending in and along a longitudinal groove in each of the web regions.

13 Claims, 13 Drawing Figures

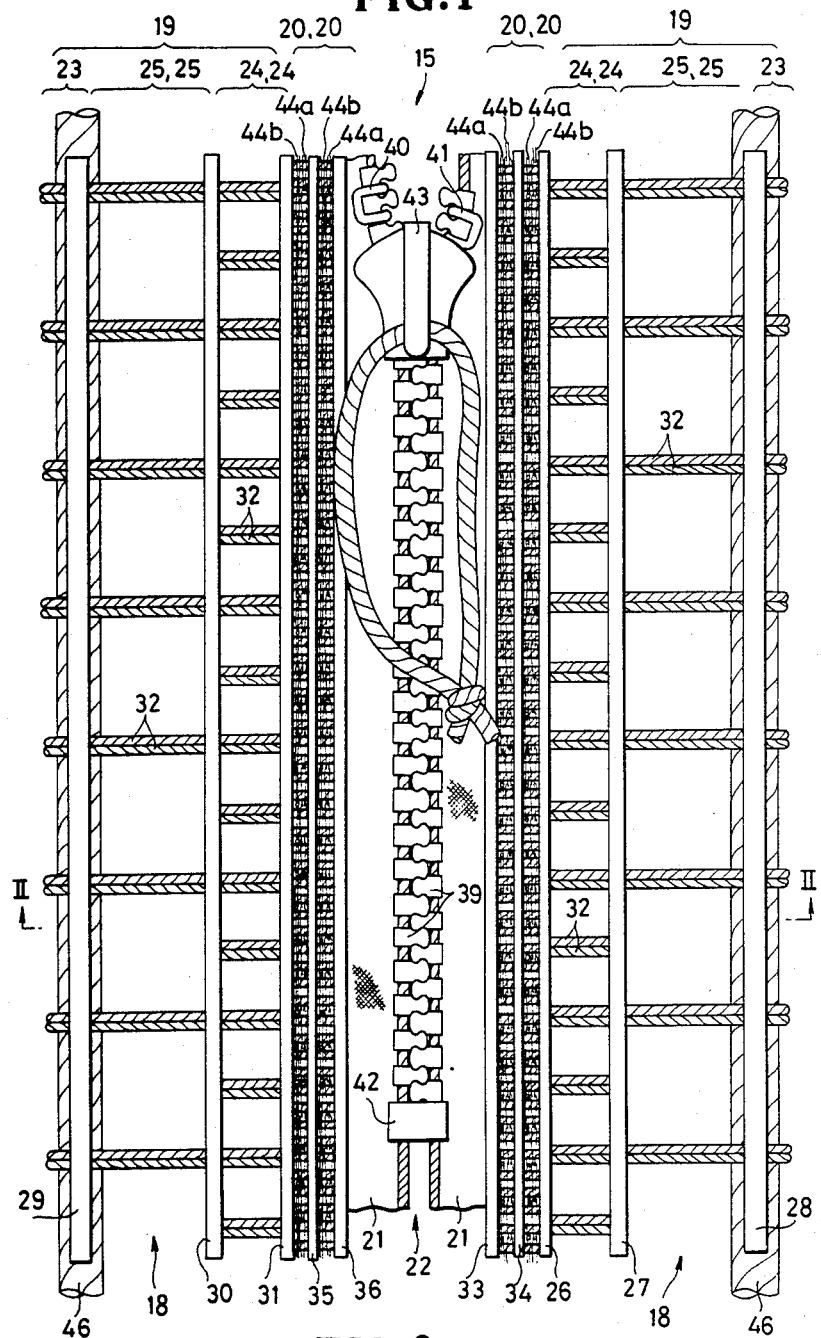
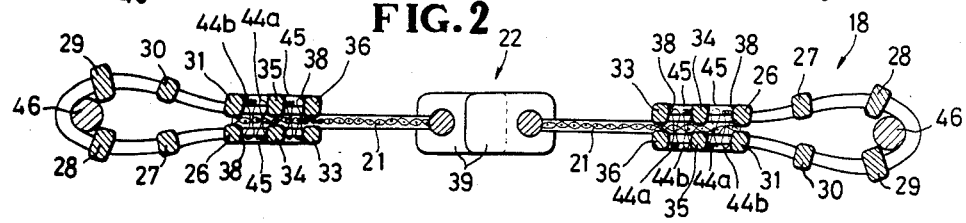

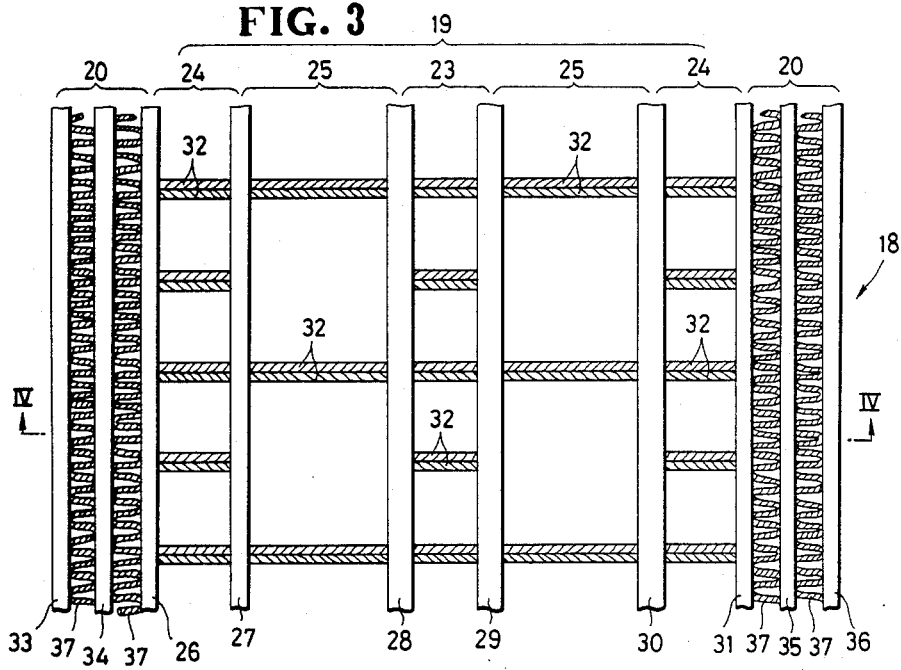
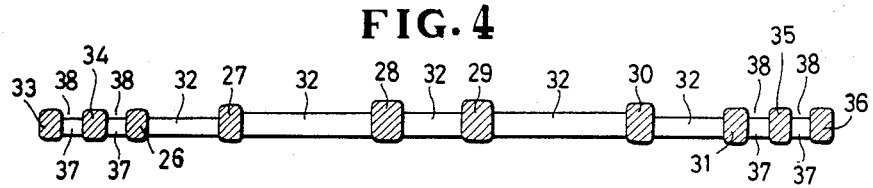

SLIDE FASTENER ASSEMBLY

BACKGROUND OF THE INVENTION

1. Field of the Invention

The present invention relates to a slide fastener assembly having a net joining structure for use in joining together a pair of confronting edges of net structure. (Proposed U.S. classification 24-205.16C).

2. Prior Art

A typical example of the net joining structures of the type described is disclosed in U.S. Pat. No. 4,056,868 patented on Nov. 8, 1977. The known structure includes a pair of warp-knitted net adapters each having a net transition region arranged for connection to one of the confronting edges of a net structure and a pair of web regions disposed at a common side of the net transition region and jointly supporting one of the stringers of a slide fastener. The net transition region comprises a mesh structure having a number of diamond-shaped meshes therein. The mesh structure includes adjoining regions of different mesh size arranged such that the smallest mesh size region adjoins one of said web regions and the largest mesh size region is that for connection to the edge of the net structure. The web region is composed of the warp chains of the net transition region extending transversely thereinto, and weft thread laid in the warp chains to fasten them together. Each of the stringers is sandwiched by the web regions and sewn thereto by sewing stitches.

The net joining structure thus arranged has been found unsatisfactory in that the slide fastener stringers are likely to become wavy, puckered or otherwise deformed, because the diamond shaped meshes vary in shape or deform when severe lateral tension is applied to the net structure. The stringers thus deformed hinder smooth sliding movement of a slider along rows of coupling elements secured to confronting edges of the stringers, and cause the rows of coupling elements to split open away from each other. Furthermore, the sewing stitches extending on and across the web regions are in danger of becoming frayed or sometimes broken upon abrasive contact with rigid foreign matter. The known adapter having such knit structure is not suitable for continuous production on a warp-knitting machine.

SUMMARY OF THE INVENTION

A slide fastener assembly has a net joining structure having a pair of warp-knitted adapters, each having a number of rectangular meshes defined by a plurality of thick warp cords and a plurality of weft threads. Each adapter includes a net transition region having adjoining first, second and third longitudinal portions of varying mesh sizes. The first portion is reinforced by a core thread for a positive connection to one of the confronting edges of a net structure. Each second portion serves to take up and distribute lateral tension uniformly over the entire length of one of the stringers of a slide fastener which is supported by a pair of web regions of the adapter. Each third portion, disposed between the first and the second portions, has rectangular meshes of the largest sizes, allowing a connecting thread to pass smoothly therethrough for connecting the first portion and the net structure's edge. The web regions each have at least one longitudinal groove opening remotely from the general plane of the stringer and receiving therein at least one row of sewing stitches, thereby protecting the sewing stitches from becoming damaged. The web regions have the rectangular meshes of the smallest size and hence permit the fastener stringer to be sewn thereto with stability.

It is an object of the present invention to provide a slide fastener assembly including a pair of warp-knitted adapters having a structure strong enough to withstand severe external stresses applied thereto either in the longitudinal or in the transverse direction thereof, without deforming or otherwise damaging a slide fastener attached to the adapters.

Another object of the present invention is to provide a slide fastener assembly having an adapter which is connectable to one of the confronting edges of a net structure with utmost ease.

A further object of the present invention is to provide a slide fastener assembly including warp-knitted adapters which can be knitted in a continuous length on a warp-knitting machine.

Yet another object of the present invention is to provide a slide fastener assembly including a slide fastener having a pair of stringers sewn to a pair of adapters by rows of sewing stitches which are protected from becoming damaged.

Many other advantages, features and additional objects of the present invention will become manifest to those versed in the art upon making reference to the detailed description and the accompanying drawings in which certain preferred embodiments incorporating the principles of the present invention are shown by way of illustrative example.

BRIEF DESCRIPTION OF THE DRAWINGS

FIG. 1 is a fragmentary plan view of a slide fastener assembly according to the present invention;

FIG. 2 is a schematic cross-sectional view taken along line II—II of FIG. 1;

FIG. 3 is an enlarged developmental or unfolded view of a portion of FIG. 1;

FIG. 4 is a cross-sectional view taken along line IV—IV of FIG. 3;

DETAILED DESCRIPTION OF THE PREFERRED EMBODIMENTS

As shown in FIG. 1, a slide fastener assembly for joining together a pair of confronting edges of net structure comprises a pair of warp-knitted net adapters 18, 18

Figure 7:
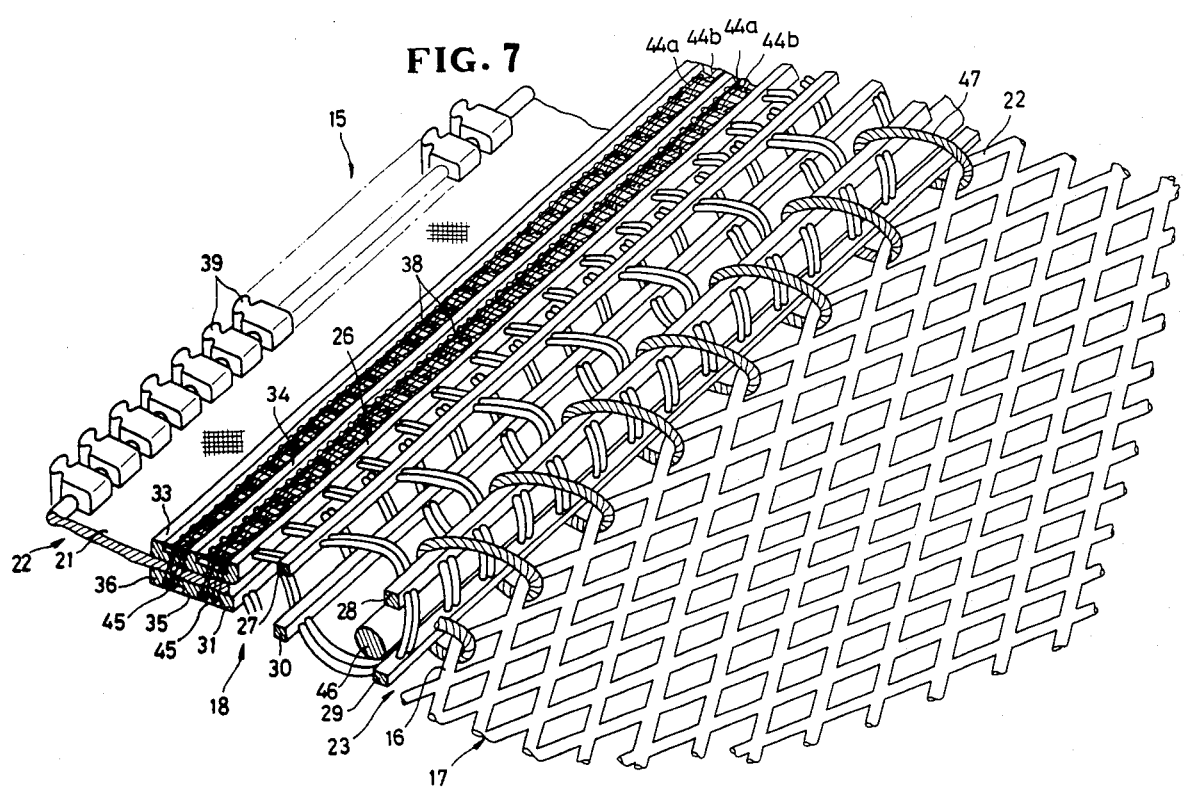
FIG. 7 is an enlarged fragmentary perspective view of a half of the slide fastener assembly as attached to an edge of net structure.

(hereinafter referred to as "adapters") having a number of rectangular openings or meshes. Each of the adapter 18, 18 includes a net transition region 19 arranged for connection to one of the confronting edges of the net structure, and a pair of superimposed web regions 20, 20 connected to a longitudinal edge of the net transition region 19 and jointly supporting one of the stringers 21 of a slide fastener 22. One such net structure 17 having a confronting edge 16 is shown in FIG. 7.

As shown in FIG. 1, the net transition region 19 has a first portion 23 (not including a core thread 46) extending along the opposite edge thereof remote from the slide fastener stringer 21. The net transition region 19 is folded over on itself and is shown in FIG. 3 in an unfolded manner whereby the first portion 23 appears centrally. The region 19 further includes a pair of second portions 24, 24 extending adjacent to the web regions 20, 20, respectively, and a pair of third portions 25, 25 extending respectively between the first portion 23 and the second portions 24, 24. The third portions 25, 25 have a mesh size larger than that of the first and second portions 23, 24, 24. The first and second portions 23, 24, 24 have substantially a uniform mesh size. The net transition region 19 is composed of a plurality of warp cords 26–31 extending longitudinally thereof and a plurality of weft threads 32 which, as described below in connection with FIG. 5, have longitudinal portions 32a extending longitudinally of the warp cords 26–31 and transverse portions 32b extending in pairs perpendicularly to and between the warp cords 26–31 to jointly define therebetween the meshes of the aforesaid sizes. The web regions 20,20 are composed of a plurality of warp cords 33–36 extending longitudinally thereof in parallel relation to the warp cords 26–31 and a plurality of weft threads 37 extending substantially in parallel to the weft threads 32 to jointly define therebetween meshes much smaller than those of the net transition region 19. The weft threads 37 are thinner than the weft threads 32.

Figure 5:
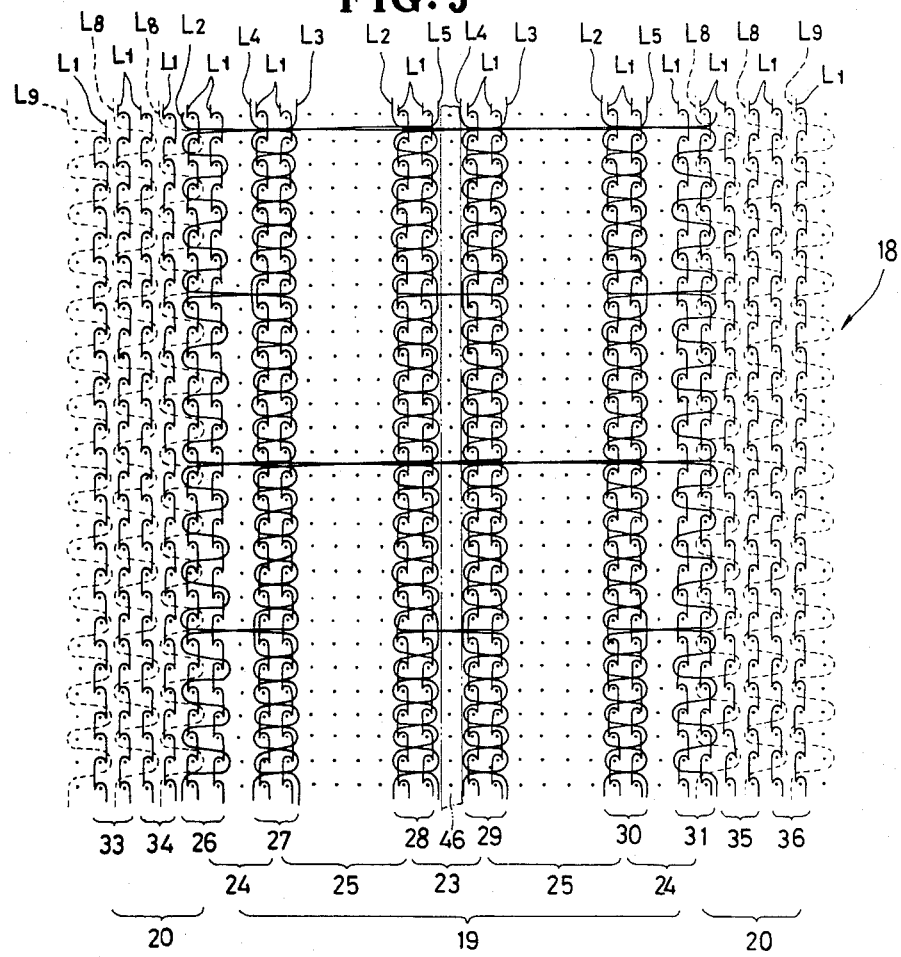
FIG. 5 is a point diagram for the warp-knitted net adapter of FIG. 3.
Figure 6:
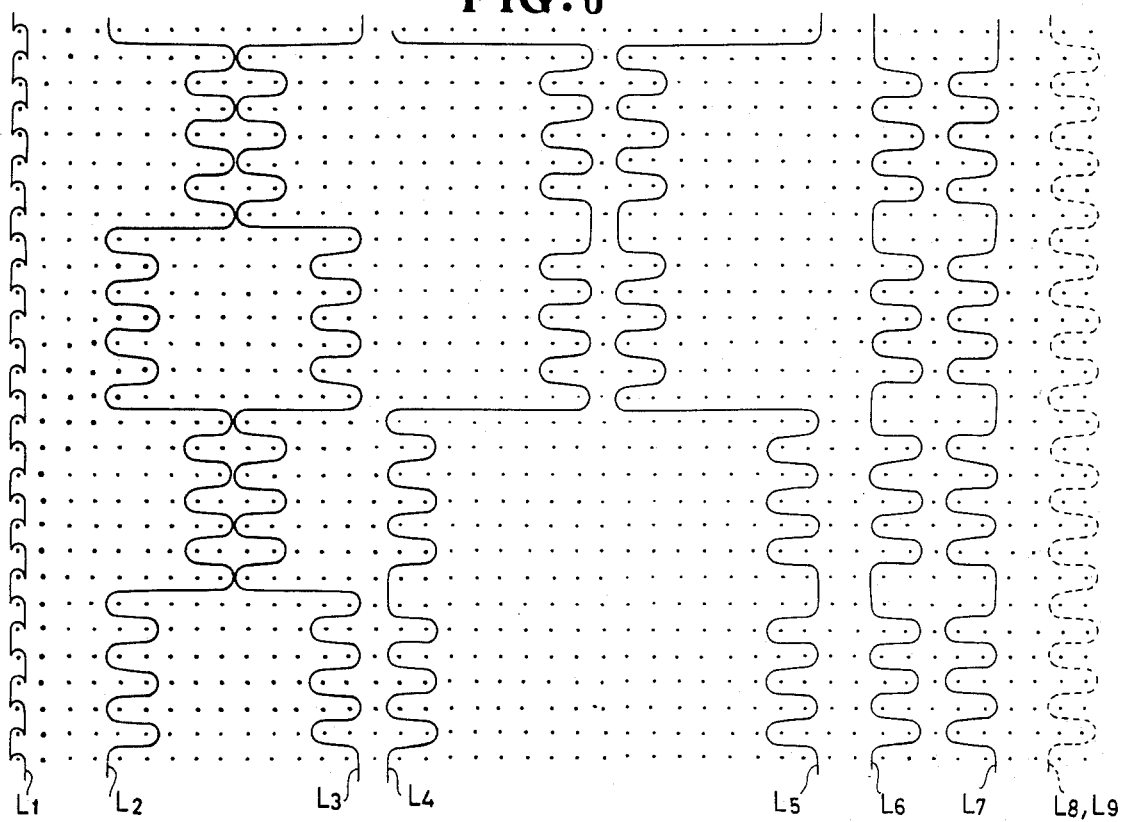
FIG. 6 is a point diagram showing lapping movements of the respective threads constituting the warp-knitted adapter of FIG. 5.

As shown in FIG. 5, the warp cords 26–31 of the net transition region 19 include warp threads L1 knitted in pairs as chain stitches and longitudinal portions 32a of a plurality of weft laid-in threads L2–L5 knitted with the chain stitches L1. Transverse portions 32b of the respective weft laid-in threads L2–L5 extend in pairs between the warp cords 26–31 and jointly constitute the weft threads 32b the transition region 19. The warp cords 33–35 of the web regions 20, 20 also include warp threads L1 knitted in pairs as chain stitches and longitudinal portions of a plurality of weft laid-in threads L8, L9 knitted with the chain stitches L1. The weft threads 37 of the web regions 20, 20 are constituted by transverse portions of the weft laid-in threads L8, L9, respectively. Although not shown in FIG. 5, a plurality of threads L6, only one of which is shown in FIG. 6, is laid warpwise in the warp cords 27–31, 33–36, respectively, and a plurality of warp threads L7, only one of which is shown in FIG. 6, is also laid warpwise in the warp cords 26–30, 33–36. The threads L6 L7 have patterns symmetrical with each other as shown in FIG. 6 whereby they cooperate together in tightly binding together the respective pairs of the warp threads L1 of the warp cords 26–31, 33–36.

As shown in FIG. 6, the threads L1–L9 have respective patterns as follows:

| Thread | Pattern |
| --- | --- |
| L1 = | 0 - 1/1 - 0. |
| L2 = | 5 - 5/3 - 3/5 - 5/3 - 3/5 - 5/3 - 3/5 - 5/0 - 0/2 - 2/0 - 0/2 - 2/0 - 0/2 - 2/0 - 0. |
| L3 = | 0 - 0/2 - 2/0 - 0/2 - 2/0 - 0/2 - 2/0 - 0/5 - 5/3 - 3/5 - 5/3 - 3/5 - 5/3 - 3/5 - 5. |
| L4 = | 8 - 8/6 - 6/8 - 8/6 - 6/8 - 8/6 - 6/8 - 8/8 - 8/6 - 6/8 - 8/6 - 6/8 - 8/6 - 6/8 - 8/0 - 0/2 - 2/0 - 0/2 - 2/0 - 0/2 - 2/0 - 0/0 - 0/2 - 2/0 - 0/2 - 2/0 - 0/2 - 2/0 - 0. |
| L5 = | 0 - 0/2 - 2/0 - 0/2 - 2/0 - 0/2 - 2/0 - 0/0 - 0/2 - 2/0 - 0/2 - 2/0 - 0/2 - 2/0 - 0/8 - 8/6 - 6/8 - 8/6 - 6/8 - 8/6 - 6/8 - 8/8 - 8/6 - 6/8 - 8/6 - 6/8 - 8/6 - 6/8 - 8. |
| L6 = | 2 - 2/0 - 0/2 - 2/0 - 0/2 - 2/0 - 0/2 - 2. |
| L7 = | 0 - 0/2 - 2/0 - 0/2 - 2/0 - 0/2 - 2/0 - 0. |
| L8,L9 = | 2-2/0-0. |

As best shown in FIG. 4, the adapter 18 thus knitted has the warp cords 26–31, 33–36 thicker than the weft threads 32, 37 so that a pair of longitudinal grooves 38, 38 is defined between every adjacent pair of warp cords 26–31, 33–36 at the opposite sides of the adapter 18. The threads L1, L6, L7 may comprise multifilament yarns made of polyester and the threads L2, L3, L4, L5, L8 may comprise twisted yarns made of polyester. Each thread L9 serves as a connecting thread for connecting two adjacent adapters 18 along their confronting edges, thereby enabling the production of a plurality of laterally connected adapters simultaneously. The connecting threads L9 are made preferably of water-soluble synthetic resin fibers, so that the adapters 18 can be separated by being dipped into water after having been knitted.

The adapter 18 can be produced easily on a warp-knitting machine (not shown) in a substantially endless, continuous length which may be severed into pieces of desired lengths by a hot cutting blade or another suitable cutting means (not shown). The cut ends of the respective adapter pieces are prevented from fraying by fusion together of the synthetic resin yarn ends. As the warp cords 26–31, 33–36 are composed of the warp threads L1 knitted in pairs as chain stitches and the longitudinal portions of the weft laid-in threads L2–L5, L8, L9 knitted with the chain stitches, the adapter 18 is made per se stable in structure and rigid in construction.

The adapters 18, 18 are then attached respectively to the stringers 21, 21 of the slide fastener 22 to thereby constitute the slide fastener assembly 15 shown in FIGS. 1 and 2. To make the attachment, each adapter 18 is folded overon itself about the first portion 23 of the net transition region 19 with the reinforcing core thread 46 being held firmly by and between the warp cords 28, 29 of the first portion 23. Each stringer 21 is sandwiched between the web regions 20, 20 of the adapter 18 and then is sewn to the same by two pairs of rows of sewing stitches 44a, 44b, such as lock stitches or double chain stitches, each pair of rows of sewing 44a, 44b extending in and along one longitudinal groove 38, which is devoid of warp cords, across the weft threads 37 of each web region 20. In order to increase the binding strength of the sewing stitches 44a, 44b and to distribute such increased binding strength uniformly over the web regions 20, 20, the sewing stitches 44a, 44b are formed by driving a pair of sewing needles (not shown) through each stringer 21 from oppoiste sides thereof such that a needle thread of the stitches 44a and a looper thread of the stitches 44b appear in each longitudinal groove 38.

The warp cords 26, 31, 33-36 serve, in adjacent pairs, to prevent the sewing stitches 44a, 44b from displacing outside the grooves 38 and from being worn out or damaged upon engagement with rigid foreign matter such as rocks, stones and the like. The warp cords 26, 31, 33-36 further serve to grip the stringers 21, 21 stably in position. At least the sewing stitches 44a, 44b in each groove 38 are covered with a layer of synthetic resin 45, and more preferably the groove 38 is filled with the synthetic resin layer 45, as shown in FIG. 2. With this arrangement, the sewing stitches 44a, 44b are completely protected from any degree of damage, such as loosening, fraying, abrasive wear or the like.

The slide fastener 22 shown in FIG. 1 has a pair of rows of coupling elements 39, 39 moun-ted on and along a pair of confronting edges of the stringers 21, 21, respectively. A pair of top end stops 40, 41 is mounted at the upper end of the slide fastener 22 adjacent to a pair of uppermost ones of the coupling elements 39, 39, respectively. The slide fastener 22 further has a bottom end stop 42 mounted at the lower end thereof transversely across the confronting edges of the stringers 21, 21. A slider 43 is slidably mounted on the rows of coupling elements 39, 39 for bringing them into and out of interdigitating engagement with each other to close and open the slide fastener 22 in a well known manner.

As shown in FIG. 7, each adapter 18 of the slide fastener assembly 15 is attached to one of the confronting edges or endmost threads 16 of the net structure 17 by a connecting rope or cord 47. The connecting cord 47 extends successively through the mesh openings in the adapter's third portions 25 and the mesh openings in the net structure's longitudinal edge 16 spirally over and around the warp cords 28, 29, the reinforcing core thread 46 and the endmost threads 16 of the net structure 17. The third portions 25 with the meshes of the largest size allow the connecting cord 47 to pass therethrough with utmost ease, with the result that a simple and time-saving connection is achieved.

With the slide fastener assembly 15 thus constructed, the slide fastener 22 can be protected against deformation or damage under the influence of severe external stresses because such stresses, when applied on the net structure 17 in the transverse direction of the adapters 18, 18, are taken up and distributed uniformly over the entire length of the slide fastener stringers 21, 21 by means of the net transition region 19, 19 having rectangular meshes of varying sizes defined by the thick warp cords 26-31 and the weft thread pairs 32. The warp cords 26-31, 33-36 have a strength enough to withstand severe external stresses applied to the adapters 18, 18 in the longitudinal direction thereof. Furthermore, the web regions 20, 20 having the smallest meshes, and made compact, permit the fastener stringers 21, 21 to be sewn thereto with stability and to a nicety. The adapter's first portion 23, having the thick warp cords 28, 29 and the reinforcing core thread 46 disposed between the warp threads 28, 29, provides a positive connection to each edge 16 of the net structure 17 during a long period of use.

Figure 8:
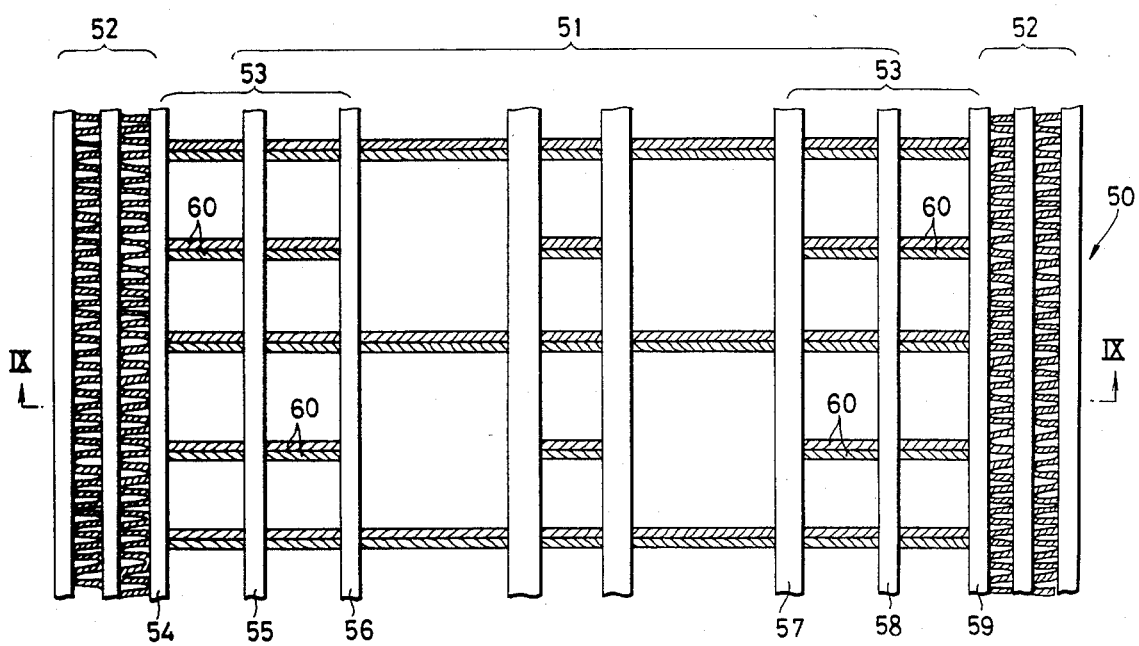
FIG. 8 is a view similar to FIG. 3 of another embodiment of the present invention.
Figure 9:
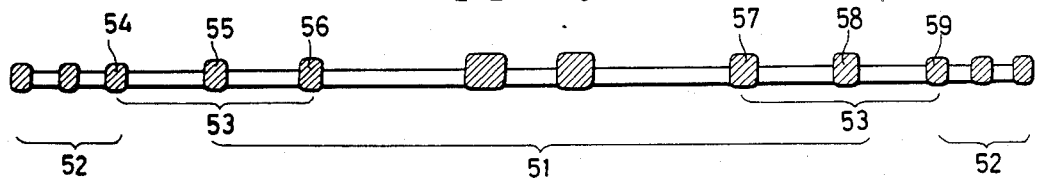
FIG. 9 is a cross-sectional view taken along line IX—IX of FIG. 8.
Figure 10:
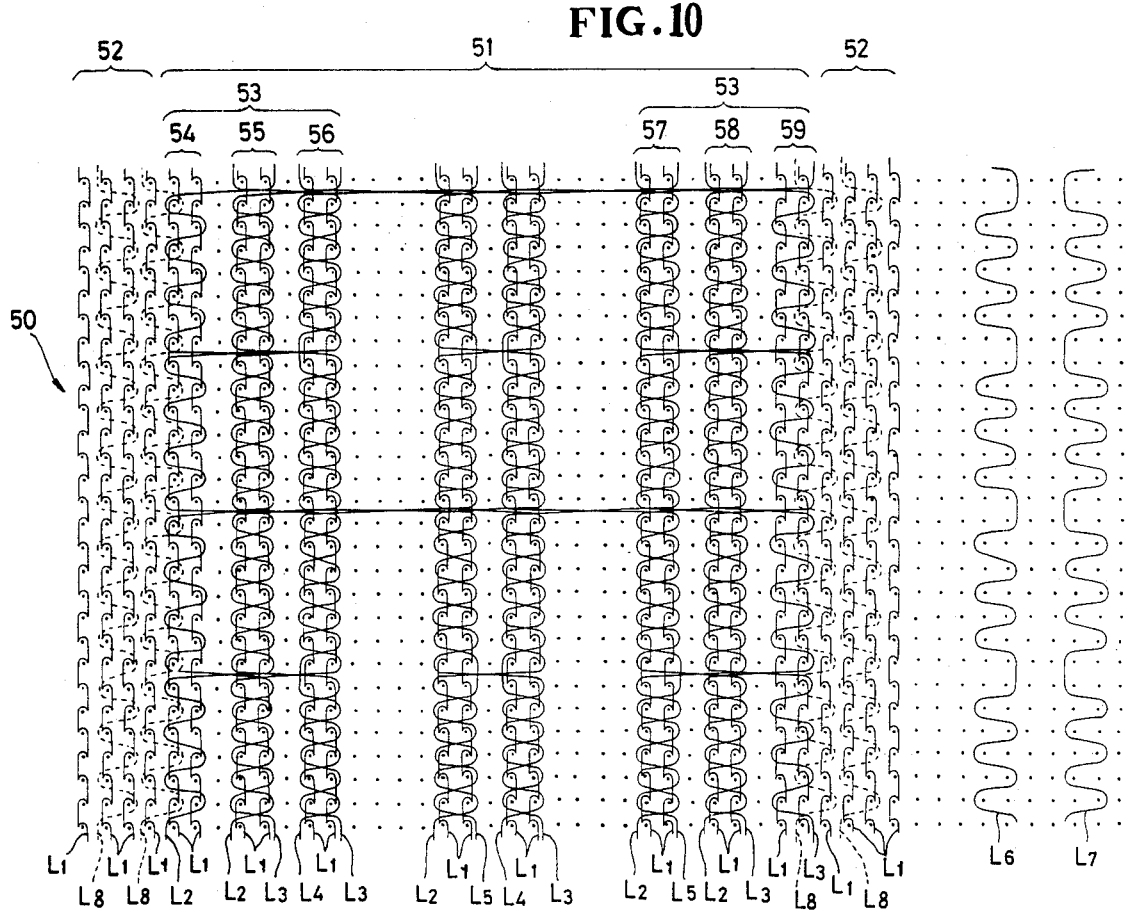
FIG. 10 is a point diagram for the warp-knitted net adapter of FIG. 9.

FIGS. 8 and 9 show a modified adapter 50 including a net transition region 51 and a pair of web regions 52, 52 disposed at opposite sides of the net transition region 51. The adapter 50 is substantially the same as the adapter 18 of the foregoing embodiment with the exception that the net transition region 51 includes a pair of second portions 53, 53 each having a pair of juxtaposed rows of rectangular meshes of uniform size. Each of the second portions 53 includes three warp cords 54, 55, 56 and 57, 58, 59 extending longitudinally thereof and a plurality of weft threads 60 which, as described below in connection with FIG. 10, have longitudinal portions 60a extending longitudinally of the warp cords 54-56, 57-59 and transverse portions 60b extending in pairs perpendicularly to and between the warp cords 54-56, 57-59 to jointly define therebetween the rectangular meshes. As shown in FIG. 10, the adapter 50 is composed of a plurality of threads L1-L8 each having the same pattern as a corresponding one of the threads L1-L8 shown in FIG. 6. Each of the central warp cords 55, 58 includes two of the threads L1 knitted as chain stitches and longitudinal portions 60a of the threads L2, L3 laid weftwise in the chain stitches L1. The weft threads 60 have the transverse portions 60b of the weft laid-in threads L2, L3 extending in pairs between the warp cords 54-59. The threads L6, L7 are laid warpwise in the cord 55, 58 to tightly bind the threads L1, L1 of the chain stitches. The warp cords 54, 56, 57, 59 are structurally the same as a corresponding one of the warp cords 26, 27, 30, 31 of the adapter 18 shown in FIG. 5. The adapter 50 is attached to one of the confronting edges of a net structure (not shown) after having been assembled with a slide fastener stringer and a reinforcing core thread, in the same manner as described with respect to the foregoing embodiment. The adapter 50 thus arranged is further advantageous in that lateral tension applied to the net structure is taken up more efficiently and distributed more uniformly through the second portions 53, 53 over the length of the slide fastener stringer than in the case of the adapter 18.

Figure 11:
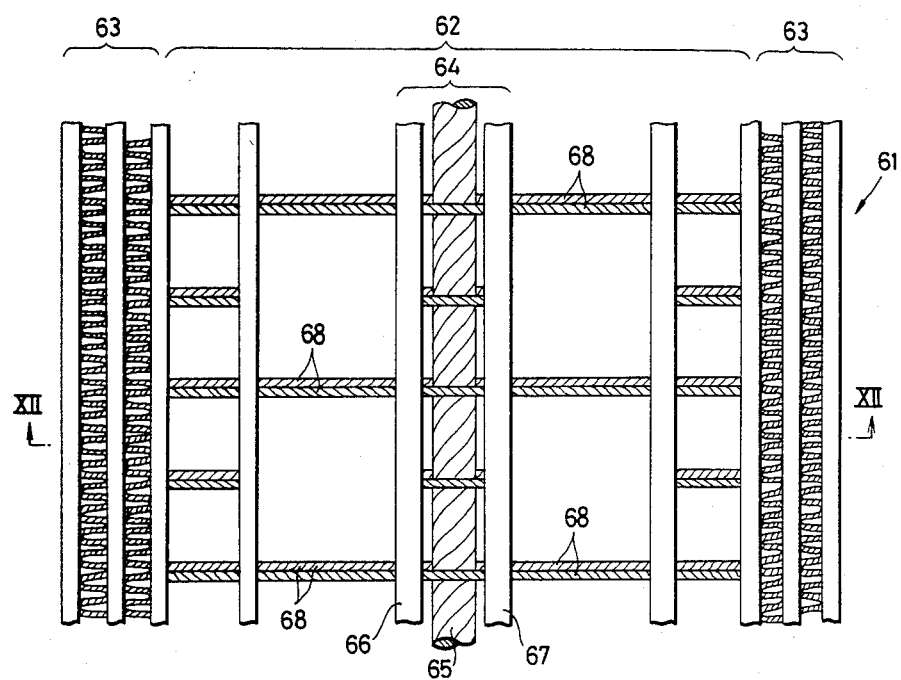
FIG. 11 is a view similar to FIG. 3 of a further modified warp-knitted net adapter.
Figure 12:
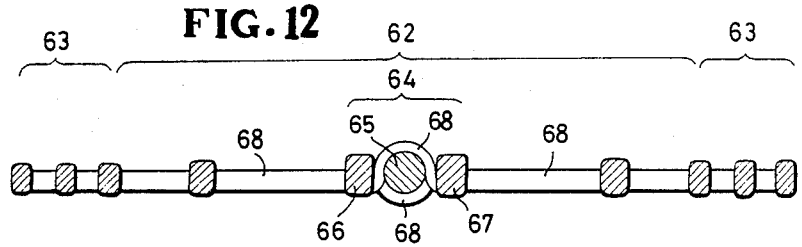
FIG. 12 is a cross-sectional view taken along line XII—XII of FIG. 11.

An adapter shown in FIGS. 11 and 12 has a net transition region 62 and a pair of web regions 63, 63. A first portion 64 of the net transition region 62 has a pair of warp cords 66, 67 between which a reinforcing core thread 65 extends. Differing from the foregoing embodiments, the core thread 65 is held by and between pairs of weft threads 68 extendinq transversely between the warp cords 66, 67 at longitudinal intervals. Such arrangement is realized by knitting the core thread 65 into the first portion 64 of the adaoter 61 as the latter is knitted. The adapter 61 with the core thread 64 knitted therein can be attached to a net structure (not shown) with utmost ease.

Figure 13:
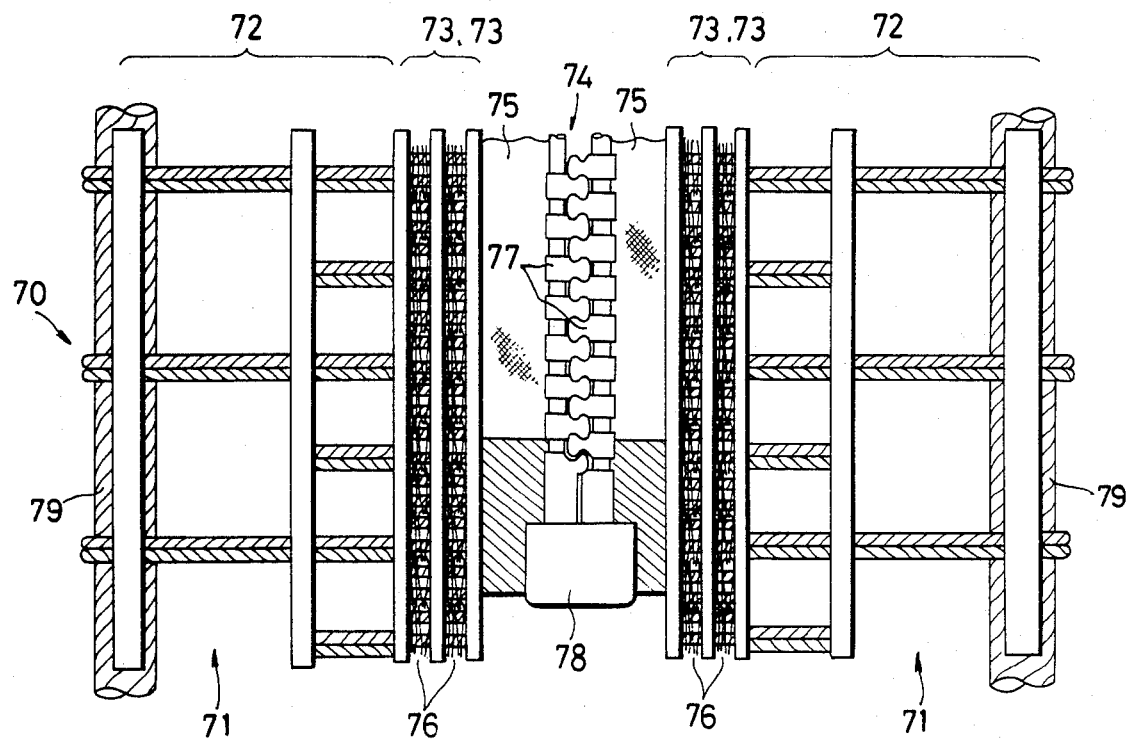
FIG. 13 is a fragmentary plan view of yet another modified slide fastener assembly according to the present invention.

FIG. 13 shows a modified slide fastener assembly 70 comprising a pair of adapters 71, 71 each having a net transition region 72 and a pair of web regions 73, 73 disposed at a common edge of the net transition region 72. A slide fastener 74 includes a pair of stringers 75, 75 secured to the adapters 71, 71 by rows of sewing stitches 76 in sandwiched relation to each pair of the web regions 73, 73, respectively. The slide fastener 74 has a pair of rows of coupling elements 77, 77 mounted on the respective stringers 75, 75 along their confronting edges and a separable bottom end stop 78 so that the stringers 75, 75 can be completely separated from each other when a slider (not shown) is located at the lowermost position adjacent to the separable bottom end stop 78. A pair of core threads 79, 79 reinforces the respective net transition regions 72, 72 arranged for connection to a pair of confronting edges of net structure (not shown).

Although various minor modificatins may be suggested by those versed in the art, it should be understood that we wish to embody within the scope of the patent warranted hereon, all such embodiments as reasonably and properly come within the scope of our contribution to the art.

We claim as our invention:

1. A slide fastener assembly for joining together a pair of confronting edges of net structure, comprising:
   (a) a slide fastener having a pair of stringers; and
   (b) a pair of warp-knitted net adapters having a number of rectangular meshes therein, each of said adapters including
   (c) a net transition region arranged for connection to one of the confronting edges of the net structure, and a pair of superimposed web regions connected to a longitudinal edge of said net transition region and jointly supporting one of said stringers, said net transition region having a first portion disposed remotely from said longitudinal edge, a pair of second portions extending adjacent to said web regions, and a pair of third portions extending between said first and said second portions, said third portions having a mesh size larger than that of said first and second portions, said web regions having a mesh size smaller than that of said first and second portions.

2. An assembly according to claim 1, said first portion including a reinforcing core thread extending longitudinally thereof.

3. An assembly according to claim 1, each of said second portions having a pair of juxtaposed rows of rectangular meshes having a uniform mesh size.

4. An assembly according to claim 1, each said adapter including a plurality of warp cords and a plurality of weft threads knitted with said warp cords and jointly defining therebetween said rectangular meshes, each said warp cord having a plurality of warp threads.

5. An assembly according to claim 4, each said warp cord comprising two of said warp threads knitted as chain stitches, and each said weft thread having portions extending longitudinally in and along said chain stitches.

6. An assembly according to claim 5, each said warp cord further having two of said warp threads laid warpwise in symmetrical patterns in said chain stitches and binding the same tightly together.

7. An assembly according to claim 4, said weft threads having longitudinal portions extending longitudinally of said warp cords and transverse portions extending in pairs perpendicularly to and between said warp cords.

8. An assembly according to claim 4, said warp threads comprising a polyester multifilament yarn and said weft threads comprising a polyester twisted yarn.

9. An assembly according to claim 1, said web regions each having at least one groove extending longitudinally thereof and opening remotely from the general plane of said stringer, said stringer being sewn to said web regions by at least one row of sewing stitches extending into and along said groove.

10. An assembly according to claim 9, said row of sewing stitches being covered with a layer of synthetic resin also extending into and along said groove.

11. An assembly according to claim 9, said groove being filled with a layer of synthetic resin.

12. An assembly according to claim 9, a pair of rows of double chain sewing stitches extending in symmetrical patterns in said groove such that a needle thread of one row of sewing stitches and a looper thread of the other row of sewing stitches appear in said groove.

13. An assembly according to claim 2, said reinforcing core thread being knitted in said first portion

* * * * *